J. T. TERRY, Jr.
PROCESS FOR RECOVERING METALLIFEROUS CONSTITUENTS OF ORES.
APPLICATION FILED SEPT. 8, 1913.
1,094,760.
Patented Apr. 28, 1914.
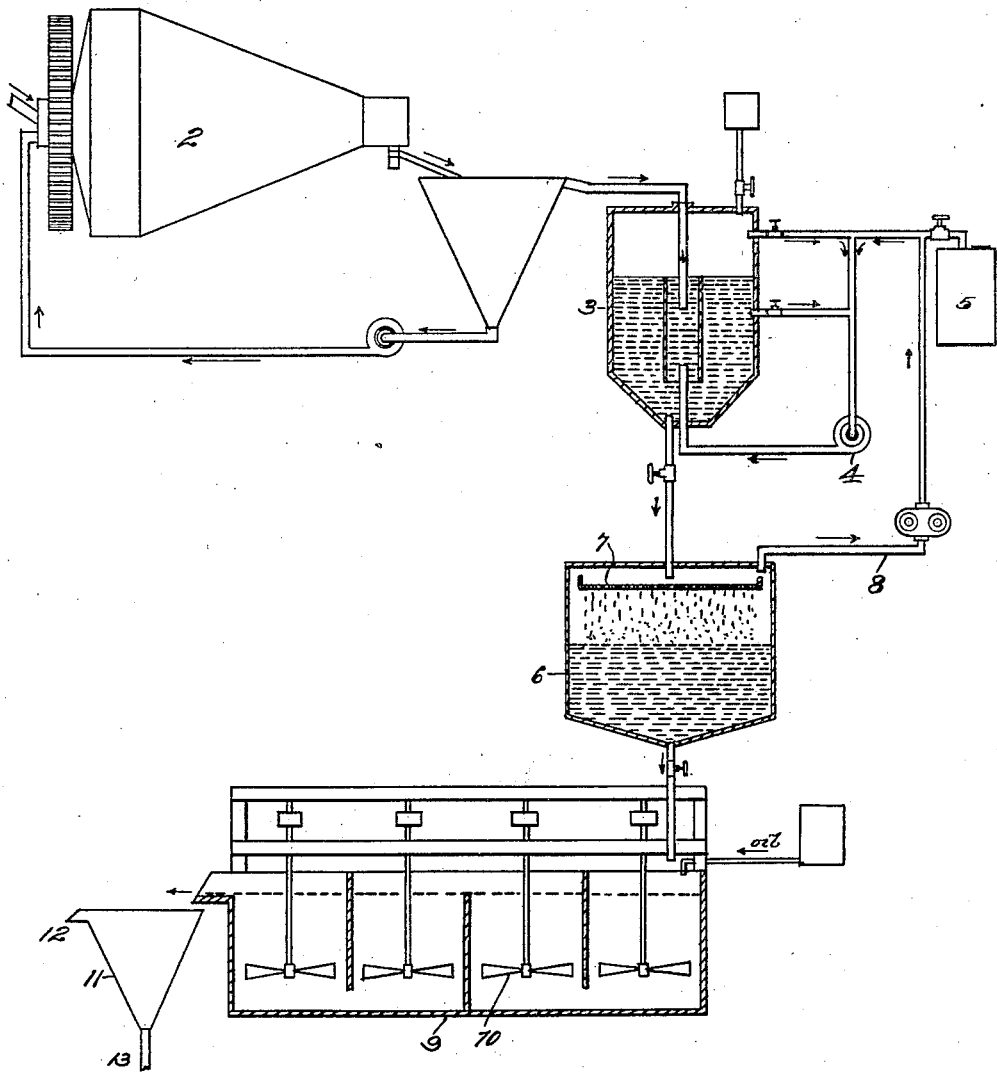

UNITED STATES PATENT OFFICE.

JOSEPH T. TERRY, JR., OF SAN FRANCISCO, CALIFORNIA.

PROCESS FOR RECOVERING METALLIFEROUS CONSTITUENTS OF ORES.

1,094,760.  Specification of Letters Patent.  Patented Apr. 28, 1914.

Application filed September 8, 1913. Serial No. 788,575.

*To all whom it may concern:*

Be it known that I, JOSEPH T. TERRY, Jr., a citizen of the United States, residing in the city and county of San Francisco and State of California, have invented new and useful Improvements in Processes for Recovering Metalliferous Constituents of Ores, of which the following is a specification.

This invention relates to a process for the concentration and recovery of metals and metalliferous constituents of ores by first converting them to sulfids and separating the sulfid from the gangue by concentration.

I find that oils and the like manifest a greater affinity and selective action for sulfids than for other metallic mineral or chemical combinations, such as carbonates and oxids.

The object of the present invention is to provide a process for the recovery of such metalliferous constituents of ores as are not readily susceptible in their natural state to concentration by the oil flotation methods, the purpose of the process being to provide for the treatment of such refractory constituents so as to increase their affinity for a buoyant agent or vehicle.

The figure is a diagrammatic view of one apparatus for practising the method.

I have discovered that constituents of ore existing as carbonates and oxids, etc., of certain metals, such as copper, lead, silver, arsenic, antimony, mercury, bismuth, tin, cadmium, etc., are changed to sulfid combinations on the exposed surfaces of the mineral particles by hydrogen-sulfid gas, or water solutions or hydrogen-sulfid gas, and that these metallic carbonates and oxids, filmed or coated with sulfid combinations, are readily separated from the gangue by flotation processes when oil is used as a filming or buoying agent.

I find that certain metalliferous constituents of ore, and metallic salts soluble in water, such as copper sulfate or chlorid, etc., are precipitated as sulfid by hydrogen-sulfid, and these precipitated sulfids are amenable to flotation methods of recovery when oil is used as a filming or buoying agent, and also that precipitated metallic sulfids, or an emulsion of oil and precipitated sulfids added to pulp subsequently treated by flotation methods of concentration, act as nuclei for the formation of sulfid granules or coagulations and assist in the flotation of metalliferous particles.

In carrying out my process I prefer to grind the ore with water in any apparatus such as a ball or tube mill. The pulp is then agitated in a suitable tank or barrel by mechanical means, such as a centrifugal pump, into which is introduced hydrogen-sulfid gas, preferably from an external generator. This gas may be produced by any known means, but preferably by the chemical reaction between ferrous sulfid and dilute sulfuric acid. The hydrogen-sulfid gas and water solution of hydrogen-sulfid gas film the metallic carbonates and oxids of the metals referred to with sulfid combinations. After the desired result has been accomplished, the pulp is fed to an agitating apparatus and filming and buoying reagents, or reagent, are introduced, and the mass subjected to violent agitation, and the mineral sulfids, sulfid filmed carbonates and oxids, and precipitated sulfids from soluble metallic salts mentioned, are separated from the gangue or waste portion of the ore by flotation.

In carrying out my process I grind the ore with water in any apparatus, such as a ball or tube mill 2, say to pass 100 mesh, to liberate the mineral particles from the gangue or barren portion of the ore. The pulp is then agitated in a suitable tank 3 by mechanical means such as a centrifugal pump 4, and treated with hydrogen-sulfid gas from an external generator 5.

The $H_2S$ converts the carbonates and oxids, etc., of the metals affected by it, into sulfids, as for example:

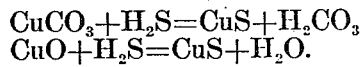
$$CuCO_3 + H_2S = CuS + H_2CO_3$$
$$CuO + H_2S = CuS + H_2O.$$

This change takes place on the exposed surfaces of mineral and metalliferous particles regardless of their size. After all the metalliferous particles have become coated with a thin skin of the sulfid of the contained metal values, the pulp is allowed to enter the tank 6 through appropriate distributing means 7 where it falls in a series of small streams. A partial vacuum is sustained in this tank 6 by suitable means on the exhauster 8 for the purpose of removing the surplus hydrogen-sulfid gas, which may be returned to the transforming tank 3 for re-use. Next the pulp is fed to a suitable agitator 9 and a small quantity of oil or oil solution or oil substance added for the purpose of coating the sulfid particles with a thin film of oil; the object of this oil coating being to render the metalliferous particles buoyant, so that separation of the metalliferous values from the gangue or silicious solids may be accomplished by flotation.

Any oil or oil solution or oil derivative suitable for the purpose may be used. In practice I find that ordinary castor oil dissolved in denatured alcohol in the proportion of one part oil to two parts alcohol is efficient. I do not confine myself to any fixed proportion of oil or oil solutions, or oil and its solvents or emulsifying agents, as this depends upon the amount of metallic sulfids, sulfid filmed carbonates and oxids to be floated and must be determined by experiment, but ordinarily this mixture not exceeding one per cent. of the ore treated.

In apparatus 8 the pulp and the oil, or oil mixture, are subjected to violent agitation until all the sulfids or sulfid coated granules have become enveloped with a film of oil; the agitation of the propellers 10 causing the oil on the particles to entrap air in the form of minute bubbles, so that the oil covered metalliferous particles will float. In other words, the oil and the air render the values buoyant so that later they can be separated by flotation while the gangue settles to the bottom and discharges through the proper channel. From the agitating apparatus 9 the pulp passes into a settling cone or other suitable tank 11 where the oil-covered values pass off as an overflow, as at 12, and the gangue discharges at the bottom, as at 13.

In treating some ores I add an alkali to the pulp which combines with the hydrogen-sulfid producing an alkaline sulfid, illustrated by the reaction between caustic soda and hydrogen-sulfid,

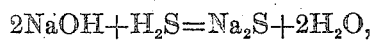
$$2NaOH + H_2S = Na_2S + 2H_2O,$$

which converts certain metalliferous constituents of ores affected by it into sulfids. The alkali may be added at any stage of the process, but preferably in the converting tank. To some ores I add a soluble metallic salt, such as copper sulfate, which is subsequently precipitated as copper sulfid and acts as nuclei for the formation of sulfid granules and coagulations and assists in the flotation of finely divided metalliferous particles. In treating certain ores I add a small amount of sulfuric acid and apply heat to assist in the flotation as described.

Having thus described my invention what I claim and desire to secure by Letters Patent, is:

1. A process which consists in the subjection of metalliferous particles of ores existing as carbonates, oxids, chlorids and sulfates, to the action of a hydrogen-sulfid gas, then subjecting the resulting product to partial vacuum, then to agitation in the presence of an oil-film-forming substance, and recovering the oil-coated particles by flotation.

2. A process for preparing non-sulfid ores for flotation methods of concentration which consists in the subjection of metalliferous particles in ore pulp, to the action of hydrogen-sulfid gas, then subjecting the resulting product to partial vacuum and finally subjecting the so treated pulp to a flotation separation.

3. A process for the recovery of metalliferous constitutents of ores, which consists in reducing the ores to a pulp, adding a soluble metallic salt and precipitating as a sulfid by hydrogen-sulfid to act as nuclei for the formation of sulfid granules and coagulations, then subjecting the resulting product to partial vacuum and finally subjecting the so treated pulp to a flotation separation.

In testimony whereof I have hereunto set my hand in the presence of two subscribing witnesses.

JOSEPH T. TERRY, Jr.

Witnesses:
IRVINE SINNETT,
W. W. HEALEY.